(12) United States Patent
Hisada

(10) Patent No.: US 7,982,815 B2
(45) Date of Patent: Jul. 19, 2011

(54) OPTICAL-SHEET SUPPORTING STRUCTURE, LIGHTING DEVICE AND DISPLAY DEVICE

(75) Inventor: Yasunari Hisada, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 261 days.

(21) Appl. No.: 12/066,544

(22) PCT Filed: Jun. 20, 2006

(86) PCT No.: PCT/JP2006/312324
§ 371 (c)(1),
(2), (4) Date: Mar. 12, 2008

(87) PCT Pub. No.: WO2007/049379
PCT Pub. Date: May 3, 2007

(65) Prior Publication Data
US 2009/0268121 A1     Oct. 29, 2009

(30) Foreign Application Priority Data

Oct. 27, 2005   (JP) .................................. 2005-313156

(51) Int. Cl.
*G02F 1/1333*   (2006.01)
(52) U.S. Cl. ................. 349/58; 349/59; 349/60
(58) Field of Classification Search ............... 349/58–60
See application file for complete search history.

(56) References Cited

U.S. PATENT DOCUMENTS

| | | | |
|---|---|---|---|
| 7,580,250 B2 * | 8/2009 | Shin et al. ................. | 361/679.21 |
| 2002/0041492 A1 | 4/2002 | Ichikawa | |
| 2003/0218700 A1 * | 11/2003 | Tsukamoto ..................... | 349/58 |
| 2005/0068470 A1 * | 3/2005 | Won ................................ | 349/58 |
| 2005/0088809 A1 | 4/2005 | Nakagawa et al. | |
| 2005/0146650 A1 * | 7/2005 | Chung et al. .................... | 349/58 |

FOREIGN PATENT DOCUMENTS

| | | |
|---|---|---|
| CN | 1556432 A | 12/2004 |
| JP | 02-134583 U | 11/1990 |
| JP | 03-026187 U | 3/1991 |
| JP | 11-160681 A | 6/1999 |
| JP | 2000-056303 A | 2/2000 |
| JP | 2002-117718 A | 4/2002 |
| JP | 2002-341345 A | 11/2002 |
| JP | 2005-106858 A | 4/2005 |

OTHER PUBLICATIONS

Official communication issued in the International Application No. PCT/JP2006/312324, mailed on Oct. 3, 2006.

* cited by examiner

*Primary Examiner* — David Nelms
*Assistant Examiner* — Phu Vu
(74) *Attorney, Agent, or Firm* — Keating & Bennett, LLP

(57) ABSTRACT

In a backlight device, a diffuser plate and a plurality of optical sheets are disposed above a base tray that includes a plurality of cold-cathode tubes therein. The diffuser plate is sandwiched in between a base member, which holds the bottom surface thereof, and a facing portion of an inner frame disposed on the top surface side thereof. A holding protrusion is arranged on the facing portion so as to abut on an exposed portion located on the periphery of the diffuser plate. According to this construction, even when the backlight device is used in an upright orientation, the diffuser plate can be prevented from leaning forward, and thereby pressure applied on the optical sheets can be prevented.

8 Claims, 10 Drawing Sheets

OPTICAL-SHEET SUPPORTING STRUCTURE, LIGHTING DEVICE AND DISPLAY DEVICE

BACKGROUND OF THE INVENTION

1. Field of the Invention

The present invention relates to an optical-sheet supporting structure, a lighting device and a display device.

2. Description of the Related Art

A backlight device used for a liquid-crystal display device or the like is widely known, and includes an optical component having a plurality of optical sheets stacked on a panel, such as a diffuser plate or a light guide plate (as described in JP-A-2002-341345, for example). The optical component is disposed on the front or side of a light source in order that light from the light source may be uniformly radiated to a liquid-crystal panel. A structure shown in FIG. 7 is provided as an example of its supporting structure, which supports a panel 10 and optical sheets 11 by sandwiching in the periphery thereof between a base member 15 and a holding member 16. According to this supporting structure, assembly can be readily achieved by simply laying the parts on top of one another.

In the supporting structure, preferably, a predetermined gap is formed between the holding member 16 and the optical sheets 11. In the case that the optical sheets 11 are held so as to be subjected to direct intense pressure, the optical sheets 11 may vault (See FIG. 8) when the optical sheets 11 expand or contract due to change of ambient temperature or the like. This could result in failing to uniformly radiate light from the light source to the liquid-crystal panel. However, actually the holding member 16 may apply direct pressure on the optical sheets 11 due to the following two reasons, and this should be improved.

The first reason is that the panel 10 can move due to the gap. That is, when the backlight device is used in an upright orientation, for example, the panel 10 may lean forward within the gap (or play) provided between the holding member 16 and the optical sheets 11. In recent years in particular, panels 10 have been getting larger along with increasing size of display devices. Therefore, once the panel 10 leans forward, the periphery of the optical sheets 11 may be sandwiched in between the leaning panel 10 and the holding member 16 so as to be subjected to intense pressure.

The second reason is that the holding member 16 can lean inwardly. Other components may be disposed on the holding member 16. In this case, if the holding member 16 is not adequately supported, the distal end portion 16A thereof may lean inwardly (See FIG. 9). In recent years in particular, components have been growing in size. This could result in increasing the tendency of the holding member 16 to be made of resin. In this case, high-accuracy components cannot be expected, and therefore the gap between the holding member 16 and the optical sheets 11 may be originally narrower than designed. In this instance, the distal end portion 16A of the holding member 16 may apply intense pressure on the periphery of the optical sheets 11, if it leans inwardly as described above.

SUMMARY OF THE INVENTION

In order to overcome the problems described above, preferred embodiments of the present invention provide an optical-sheet supporting structure that is capable of supporting a panel and therefore optical sheets so as not to apply pressure on the optical sheets, and provide a lighting device and a display device therewith.

An optical-sheet supporting structure according to a preferred embodiment of the present invention includes a flat panel, an optical sheet placed on the panel so that an exposed portion is left on the periphery thereof, a base-side panel support that abuts the periphery of the panel so as to hold the panel, a holding-side panel support having a frame-like shape which is disposed on the opposite side of the base-side panel support so as to hold the periphery of at least the panel in cooperation with the base-side panel support and therebetween, and a holding protrusion that is disposed on and projects from at least one of the exposed portion of the panel and a portion of the holding-side panel support opposite to the exposed portion so as to abut on the other. According to this construction, the holding protrusion restricts movement of the panel between the panel supports, and thereby the panel can be supported stably. Therefore, the panel can be prevented from leaning forward, even when the panel is used in an upright orientation.

Preferably, the present invention is embodied as follows.

The holding protrusion is preferably integrated with the holding-side panel support or the panel. Thereby, the production costs can be reduced, compared to the case in which the holding protrusion is provided as a separate component.

The holding-side panel support preferably includes a facing portion which is cantilevered and extends so as to overlap with the periphery of the optical sheet. The holding protrusion preferably is disposed on and projects from the facing portion. The projecting length of the holding protrusion is preferably larger than the thickness of the optical sheet, so that a gap is maintained between the optical sheet and the facing portion. Thus, the facing portion can be disposed so as to maintain a distance from the periphery of the optical sheet.

An escape portion corresponding to the holding protrusion preferably is formed as a notch on the optical sheet, so that a portion of the panel is exposed as the exposed portion. According to this construction, a conventional panel can be used directly.

A posture retaining portion preferably is provided, and is disposed on one of the base-side panel support and the facing portion, and abuts on the other so as to provide two-point support for the facing portion together with the holding protrusion. Thereby, the facing portion can be prevented from leaning inward, and therefore the distal end of the facing portion can be prevented from interfering with the optical sheet.

An optical-sheet supporting structure according to a preferred embodiment of the present invention includes a flat panel, an optical sheet placed on the panel so that an exposed portion is left on the periphery thereof, a base-side panel support that abuts on the periphery of the panel so as to hold the panel, and a holding-side panel support which is disposed on the opposite side of the base-side panel support and includes a facing portion positioned so as to hold the periphery of the panel and the optical sheet in cooperation with the base-side panel support and therebetween. The holding-side panel support preferably has a frame-like shape as a whole. Further included are at least two posture retaining portions arranged to retain the posture of the facing portion so that the facing portion extends along the surface of the optical sheet. According to this construction, two-or-more-point support for the facing portion is provided, and thereby firm support can be achieved.

According to a preferred embodiment of the present invention, other components can be prevented from applying intense pressure on the optical sheet. Therefore, the optical sheet can be prevented from vaulting, even when ambient temperature or the like changes. Thereby light from the light source can be radiated uniformly, which contributes to quality improvement of a lighting device.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

A first preferred embodiment according to the present invention will be explained with reference to FIGS. 1 through 4.

Figure 1:
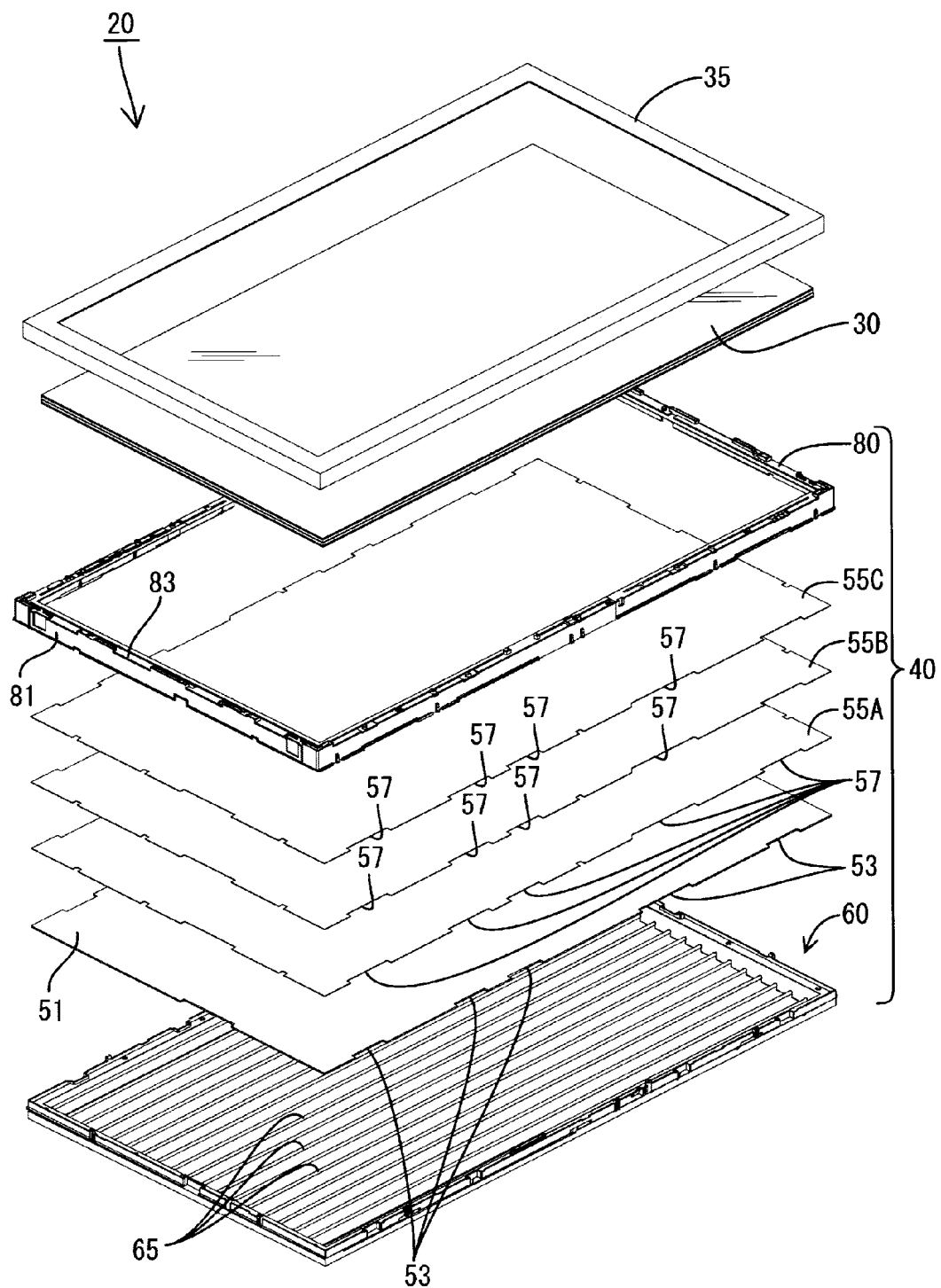
FIG. 1 is an exploded perspective view of a display device according to a first preferred embodiment of the present invention.

FIG. 1 is an exploded perspective view of a display device 20. The display device 20 preferably includes a liquid crystal panel 30 having a planar surface capable of image display, and a backlight device (corresponding to a lighting device of a preferred embodiment of the present invention) 40. The liquid-crystal panel 30 includes a pair of glass substrates, liquid crystal filled between the glass substrates, and a pair of polarizing plates applied to the outer surfaces of the respective glass substrates. It is placed on a backlight device 40 with an overlap, and held by a substantially rectangular-shaped outer frame 35.

The backlight device 40 preferably is a so-called direct-light-type backlight device, in which a plurality of cold-cathode tubes 65 positioned beneath the liquid-crystal panel 30 are arranged in a row sideways. A base tray 60 that contains the cold-cathode tubes 65 therein is provided, and a diffuser plate (corresponding to a panel of a preferred embodiment of the present invention) 51 and three optical sheets 55A-55C are disposed thereon so as to cover the opening thereof from above.

The three optical sheets (i.e., from bottom up, a diffusing sheet 55A, a lens sheet 55B and a brightness enhancement sheet 55C, for example) are formed so as to be substantially of the same size as the diffuser plate 51, and placed on the diffuser plate 51 with an overlap. The optical sheets 55A-55C and the diffuser plate 51 convert substantially-linear light emitted from each cold-cathode tube 65 into flat light, so that the light is uniformly radiated to the liquid-crystal panel 30. Each of them preferably has a substantially rectangular flat shape, and the size thereof is larger than the display area of the display device 20.

Figure 2:
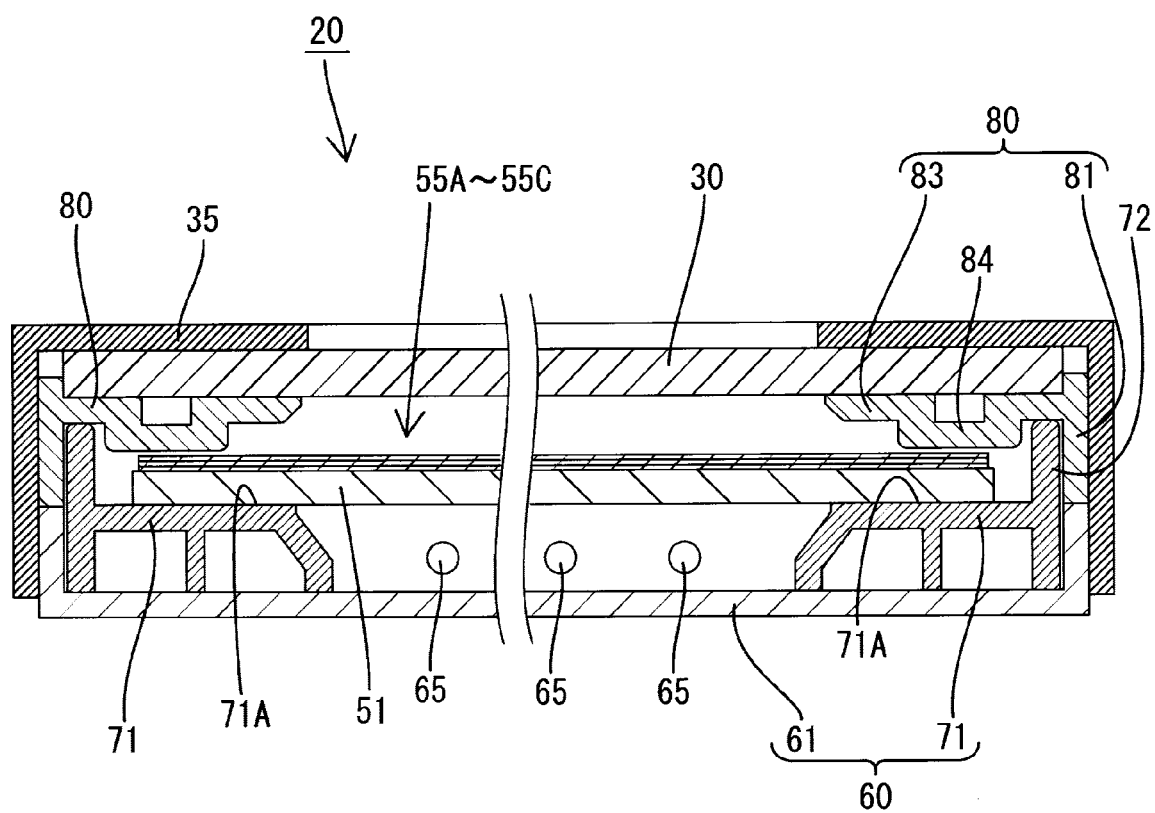
FIG. 2 is a typical sectional view of the display device.
Figure 3A:
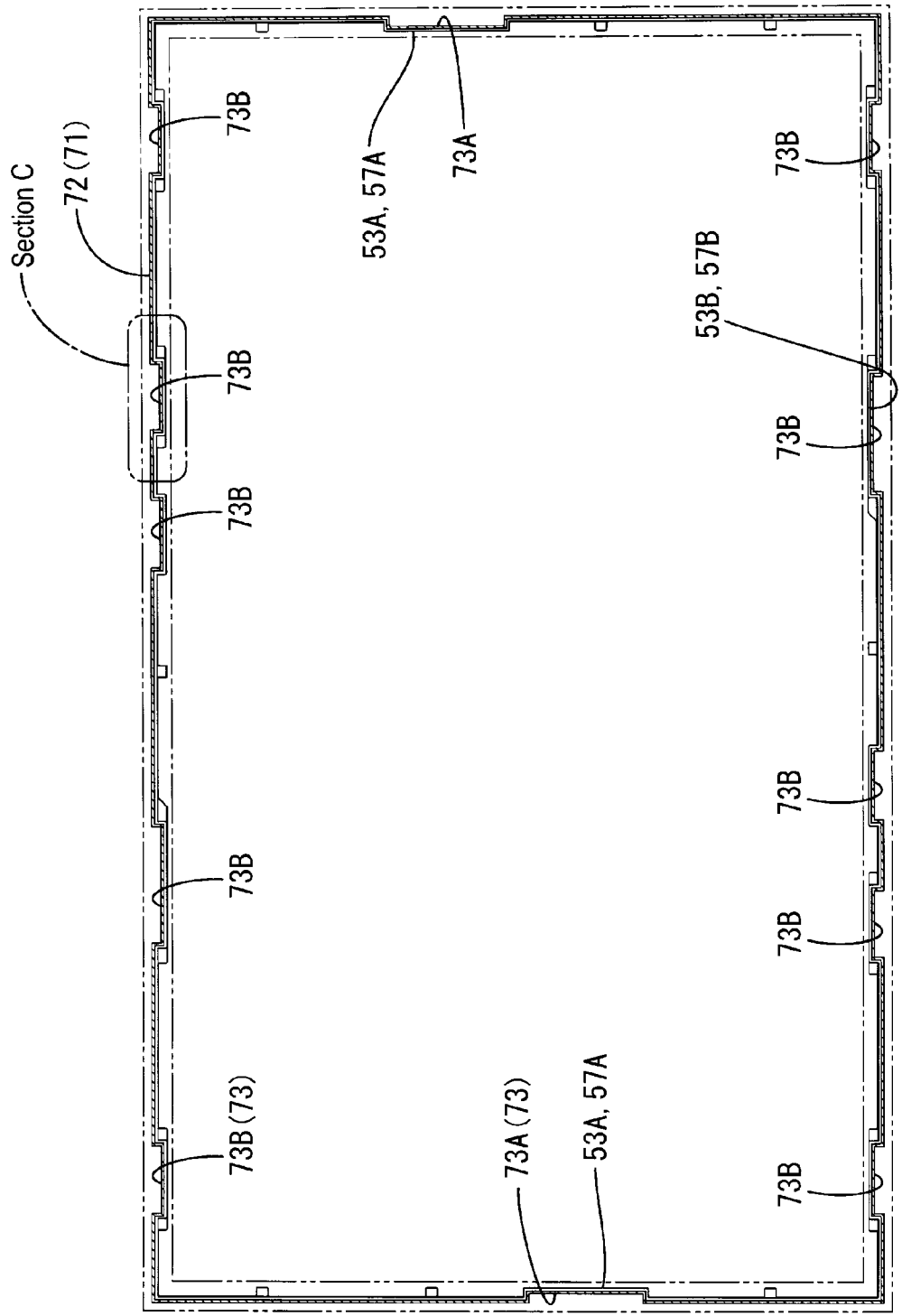
FIG. 3A is a plan view of a backlight device.
Figure 3B:
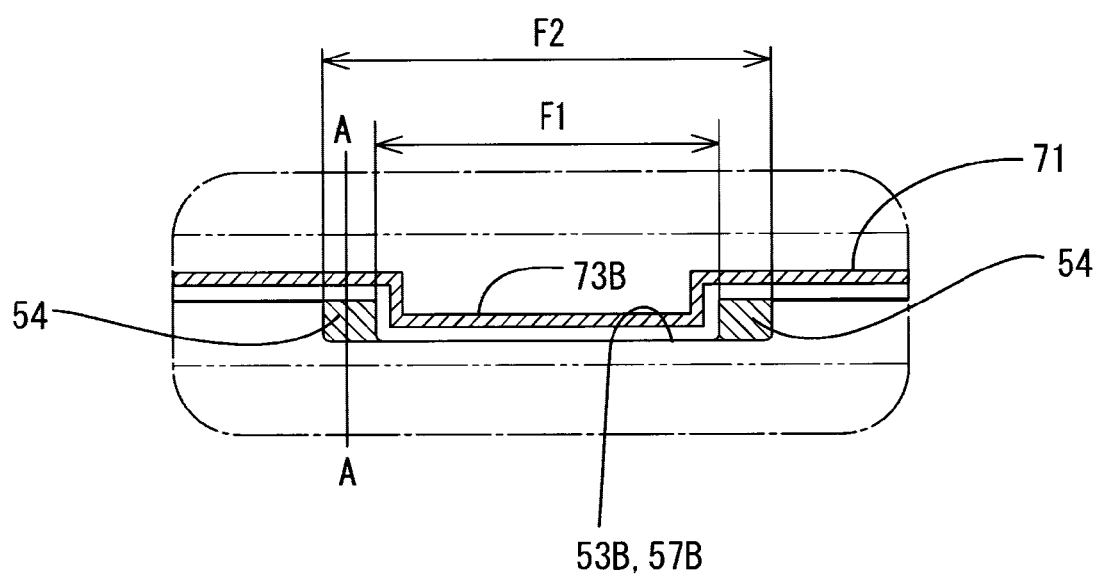
FIG. 3B is an enlarged view of Section "C" shown in FIG. 3A.

In FIG. 1, symbol 80 designates a substantially rectangular-shaped inner frame (corresponding to a holding-side panel support of a preferred embodiment of the present invention), which holds the diffuser plate 51 and the three optical sheets 55A-55C in cooperation with the base tray 60 and therebetween. Hereinafter, a supporting structure for the optical sheets 55A-55C and the diffuser plate 51 will be explained in detail with reference to FIGS. 2 to 4. FIG. 2 is a typical sectional view of the display device 20. FIG. 3A is a plan view of the backlight device 40, and FIG. 3B is an enlarged view of Section "C" shown in FIG. 3A. In FIGS. 3A and 3B, the inner frame 80 is shown by the chain lines.

As shown in FIG. 2, the base tray 60 includes a metallic base panel 61 of an open-topped box shape, and a base member (corresponding to a base-side panel support of a preferred embodiment of the present invention) 71 made of synthetic resin. The base member 71 preferably has, as a whole, a frame-like shape following the contour of the diffuser plate 51, and is fitted on the inner circumference of the base panel 61 so as not to form any clearance. The upper surface of the base member 71 is provided as a flat bearing surface 71A, on which the periphery (shown as right and left edge portions in FIG. 2) of the diffuser plate 51 is held.

Further, the base member 71 includes, on the edge portion of its upper surface, a raised portion (corresponding to a posture retaining portion of a preferred embodiment of the present invention) 72 which projects upward in the figure. The raised portion 72 is arranged to extend along the entire circumference of the base member 71 as shown in FIG. 3A, and partially expands inward so as to form positioning portions 73. More specifically, a pair of positioning portions 73A are formed on the sides shown as the right and left sides in FIG. 3A, while five positioning portions 73B are formed on each of the upper and lower sides.

On the other hand, slits 53A and 53B corresponding to the positioning portions 73A and 73B are provided on the periphery of the diffuser plate 51. The concave portion of each slit 53A or 53B is engaged with the convex portion of the positioning portion 73A or 73B, so that the diffuser plate 51 is positioned in the planar directions (i.e., right and left, and upward and downward directions in FIG. 3A). The positioning portions 73 and slits 53 are spaced away from the display area of the display device 20.

Slits 57A and 57B corresponding to the positioning portions 73A and 73B are also provided on each of the optical sheets 55 stacked on the diffuser plate 51. Among the slits 57 of the optical sheets 55, the right and left slits 57A preferably have the same shape as the slits 53A of the diffuser plate 51, while some (e.g., a slit shown in Section "C") of the upper and lower slits 57B have a slit width (shown as Dimension F2 in FIG. 3B) larger than the slit width (shown as Dimension F1 in FIG. 3B) of the diffuser plate 51.

Thus, some of the slits 57B of the optical sheets 55 have a larger slit width, and thereby the extended portions (shown by the hatching in FIG. 3B, and corresponding to an escape portion of a preferred embodiment of the present invention) are formed so that areas exposed therethrough are provided as exposed portions 54 on the top surface of the diffuser plate 51.

Figure 4:
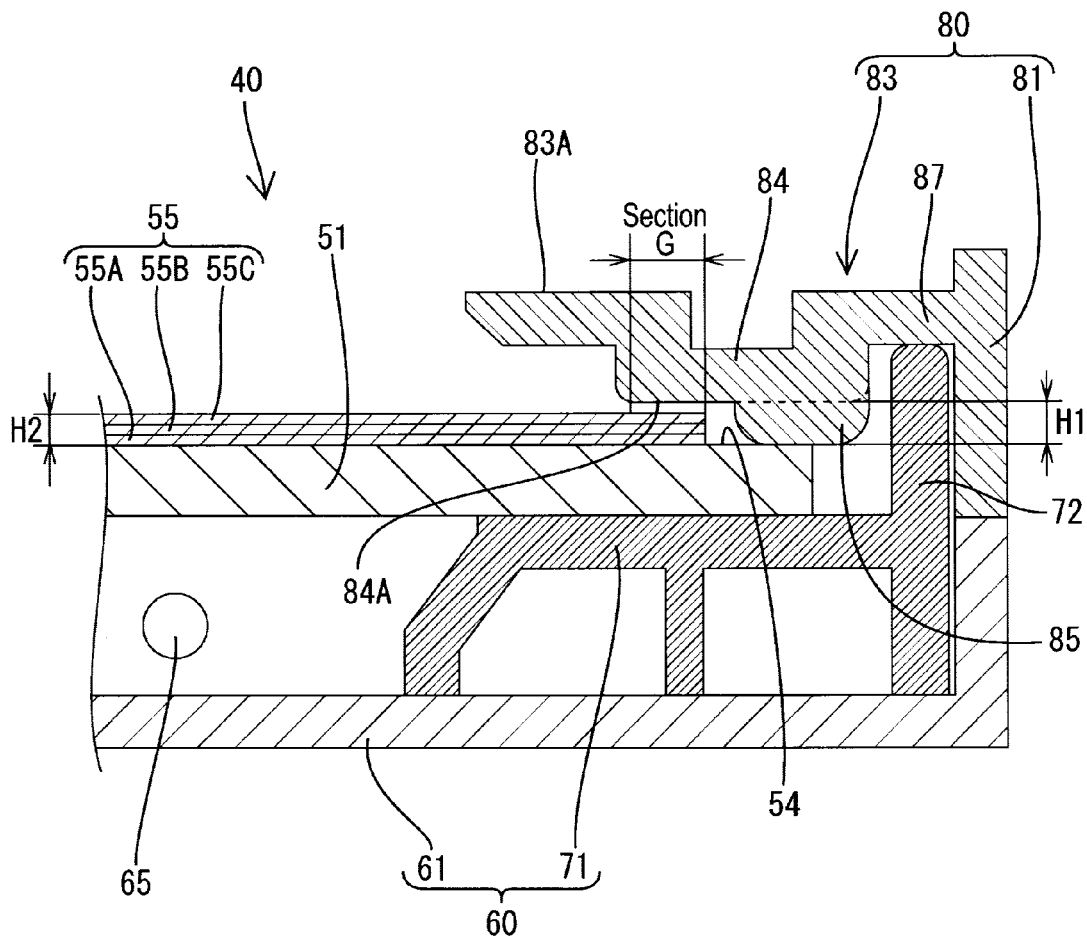
FIG. 4 is a cross-sectional view along the line A-A of FIG. 3B.

FIG. 4 is a cross-sectional view along the line A-A of FIG. 3B (i.e., a cross-sectional view of an exposed portion).

The inner frame 80 is preferably made of synthetic resin, and includes a mounting portion 81 extending vertically in FIG. 4 and a facing portion (corresponding to a facing portion of a preferred embodiment of the present invention) 83 extending horizontally and inwardly (i.e., toward the left in FIG. 4) from the close-to-upper-end portion of the mounting portion 81, so as to have a substantially L-shaped cross section. On the other hand, the raised portion 72 projecting upward in the figure is provided on the periphery of the base member 71 as described above. The height thereof is preliminarily set so that the distal end thereof properly abut on the proximal end portion 87 of the facing portion 83 of the inner frame 80. Thereby, the raised portion 72 supports the facing portion 83 from below.

Along the entire circumference of the inner frame 80, a holding base 84 opposite to the periphery of the diffuser plate 51 and the optical sheets 55 is formed on the facing portion 83 so as to sag downwards in the figure. The holding base 84 extends widthwise so as to have an area (shown as Section G in FIG. 4) overlapping with the periphery of the optical sheets 55, while a holding protrusion 85 opposite to the exposed portion 54 of the diffuser plate 51 is provided on the right edge portion of the lower surface 84A so as to project downward in the figure and abut on the exposed portion 54.

The holding protrusion 85 is integrated with the inner frame 80. The projecting length (shown as Dimension H1 in FIG. 4) from the lower surface 84A is set so as to be larger than the thickness (shown as Dimension H2 in FIG. 4) of the three optical sheets. Thereby, a gap is kept between the optical sheets 55 and the holding base 84, while the holding protrusion 85 directly holds the top surface of the diffuser plate 51.

Screw through holes (not shown) are formed on the inner frame 80, while the corresponding screw holes are formed on the opposing base member 71. Thereby, the inner frame 80 can be screwed, from above in the figure, to the base member 71. Thus, the diffuser plate 51 is immovably held between the base member 71 and the holding base 84 of the facing portion 83.

The holding protrusion 85 is provided as described above, and thereby two-point support for the cantilevered facing portion 83 can be achieved. That is, the support by the raised portion 72 is firstly provided as described above, and the second support is provided by the holding protrusion 85 abutting on the exposed portion 54.

Thus the two-point support for the facing portion 83 is provided, and thereby the following effects can be obtained. The inner frame 80 is made of resin as described above, and therefore has inadequate rigidity in itself. Further, there has been the problem that its component accuracy is not quite high. However, as shown in FIG. 2, the upper surface of the facing portion 83 is provided as a panel bearing surface 83A for the liquid-crystal panel 30, so as to support the periphery of the liquid-crystal panel 30.

Therefore, if support for the facing portion 83 is inadequate, the facing portion 83 may lean inward under the weight of the liquid-crystal panel 30. This could result in the anterior end of the holding base 84 applying pressure on the top surface of the optical sheets 55. (Particularly, in the case that a narrower gap is originally formed due to component variations, interference may occur even due to slight leaning.) However, the two-point support for the facing portion 83 is provided as described above, so that sufficient supporting strength against the weight of the liquid-crystal panel 30 can be secured. Thereby, leaning of the facing portion 83 can be restricted.

According to the present preferred embodiment, the holding protrusion 85 directly holds the top surface of the diffuser plate 51. Therefore, leaning of the diffuser plate 51 can be prevented, even when the display device 20 is used in an upright orientation, for example. Further, the two-point support for the facing portion 83 of the inner frame 80 is provided, and thereby leaning of the facing portion 83 can be effectively restricted.

In this way, the optical sheets 55 can be prevented from interfering with neighboring components such as the facing portion 83, and thereby prevented from being subjected to pressure. Therefore, the optical sheets 55 can be prevented from vaulting, even when the optical sheets 55 expand or contract due to change of ambient temperature or the like. Thereby, light from the light source can be uniformly radiated to the liquid-crystal panel.

Second Preferred Embodiment

Figure 5:
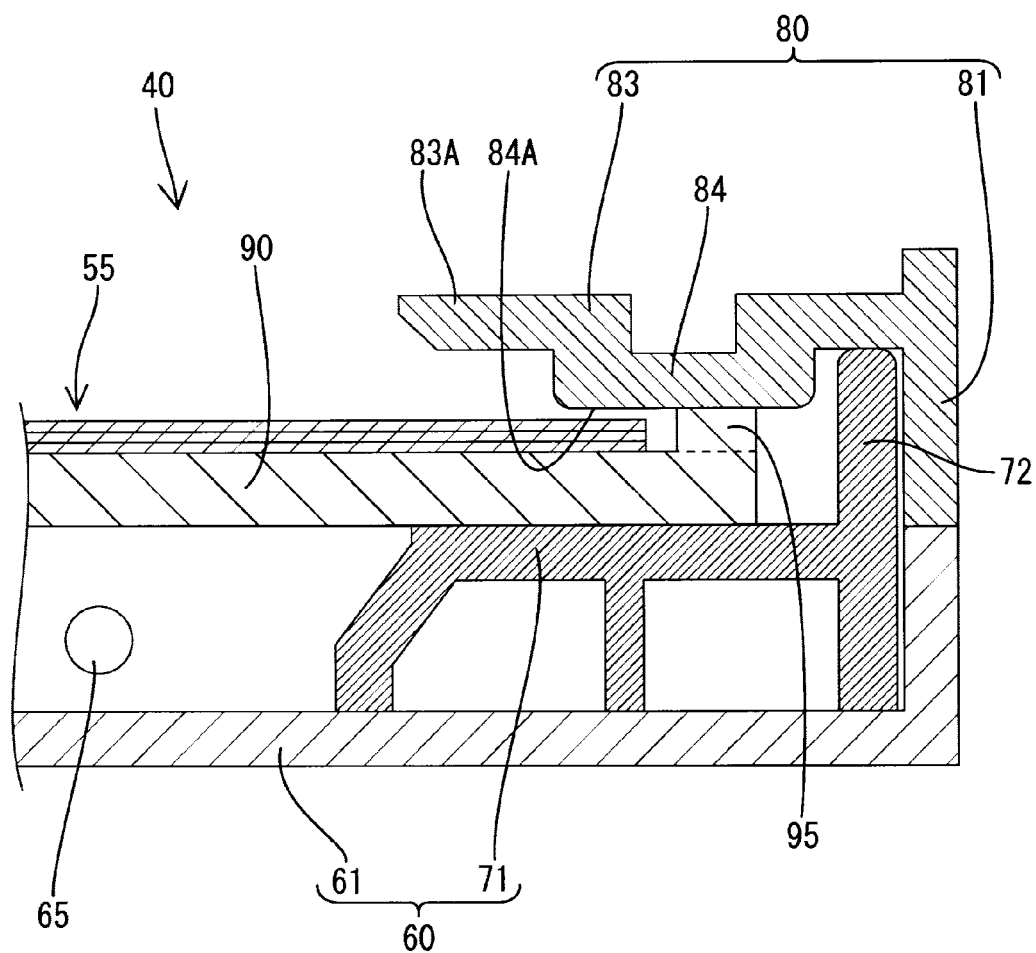
FIG. 5 is a cross-sectional view of a supporting structure for a facing portion according to a second preferred embodiment of the present invention.

Next, a second preferred embodiment of the present invention will be explained with reference to FIG. 5.

In the first preferred embodiment, the holding protrusion 85 is provided on the lower surface of the holding base 84 so that its end surface abuts on the exposed portion 54 of the diffuser plate 51. Conversely, in the second preferred embodiment, a holding protrusion 95 is arranged on a diffuser plate 90 so that its end surface abuts on the lower surface 84A of a holding base 84. According to this construction, operation and effects similar to those of the first preferred embodiment can be achieved. In FIG. 5, the same components as the first preferred embodiment are designated by the same symbols, and redundant explanation is omitted.

Third Preferred Embodiment

Figure 6:
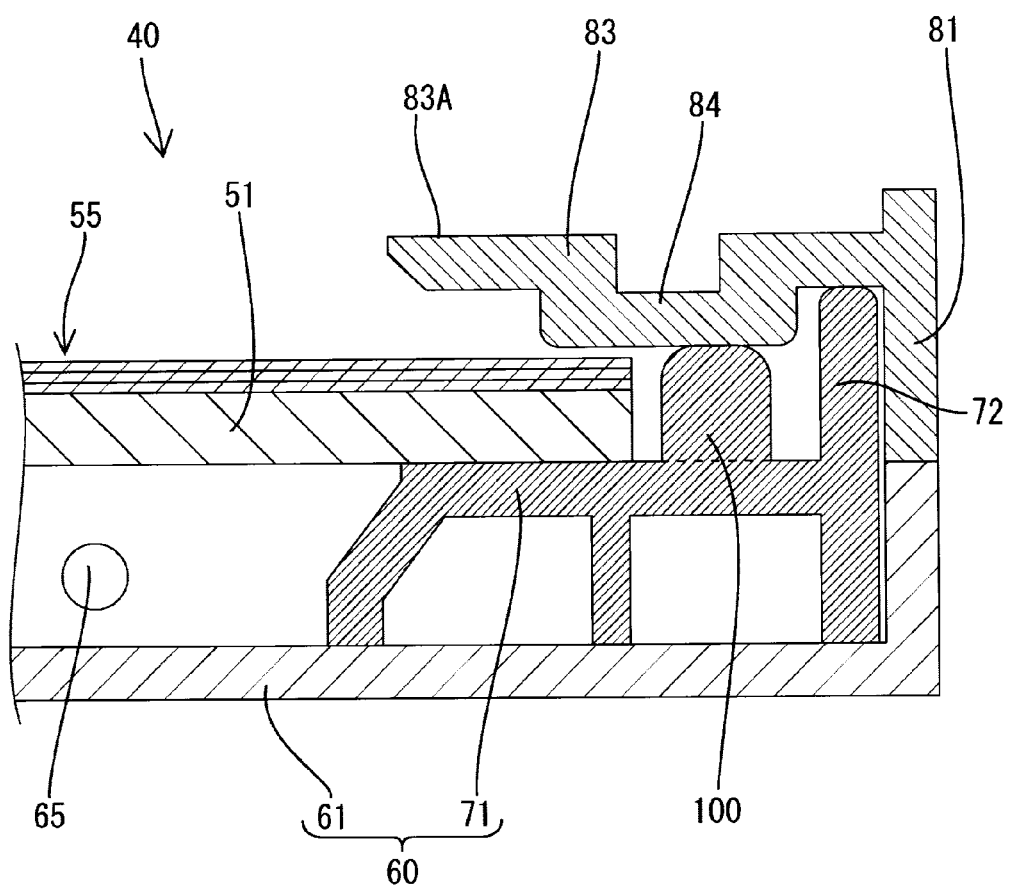
FIG. 6 is a cross-sectional view of a supporting structure for a facing portion according to a third preferred embodiment of the present invention.
Figure 7:
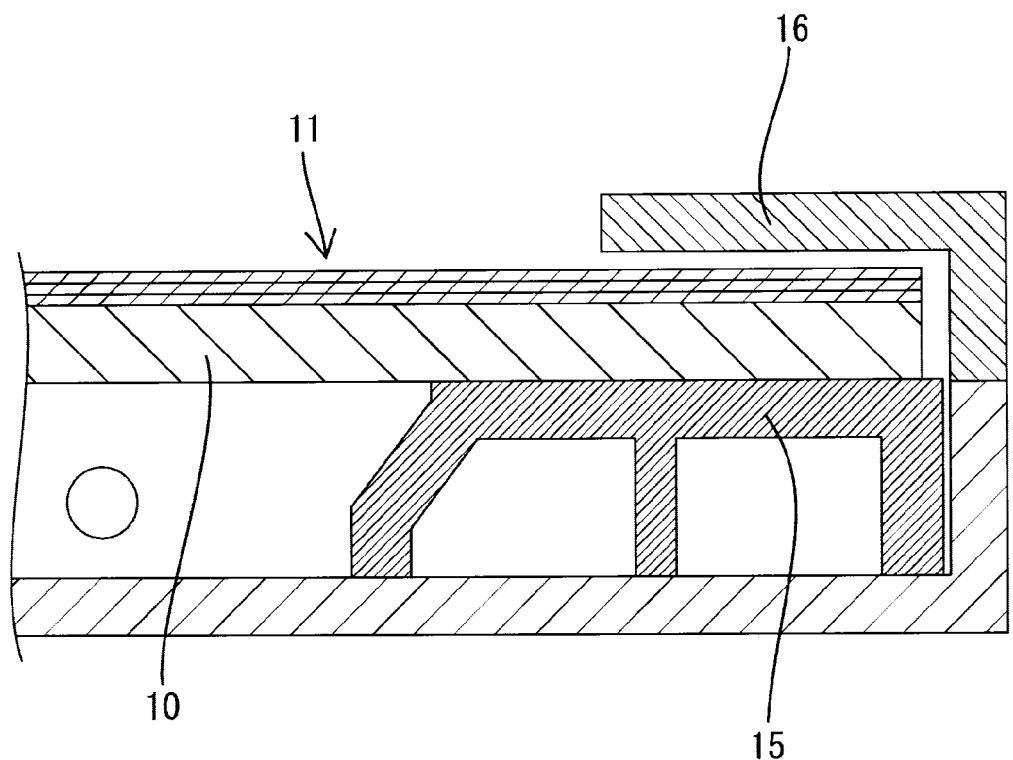
FIG. 7 is a diagram showing the prior art.
Figure 8:
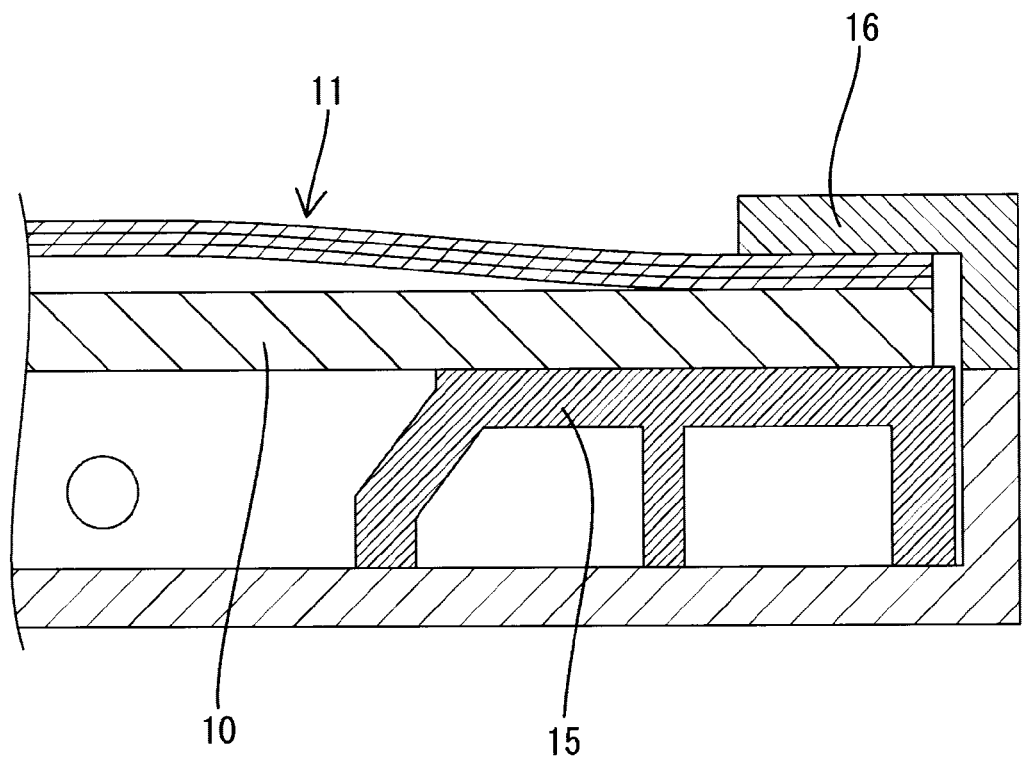
FIG. 8 is a diagram showing when optical sheets vault.
Figure 9:
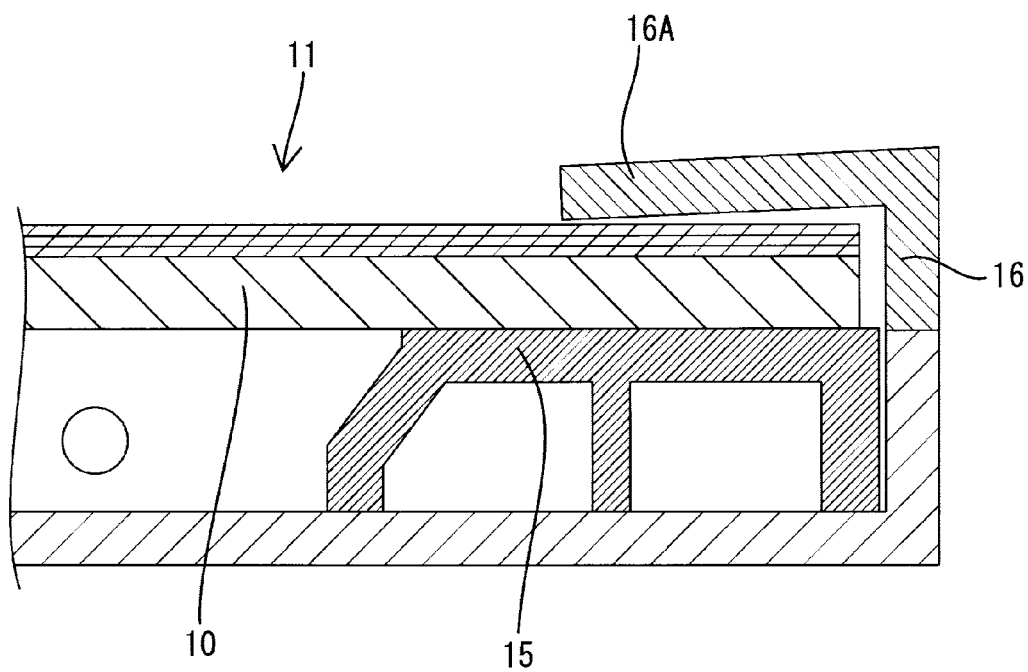
FIG. 9 is a diagram showing when a holding member leans inwardly.

Next, a third preferred embodiment of the present invention will be explained with reference to FIG. 6.

In the first preferred embodiment, two-point support for the facing portion 83 is provided by the raised portion 72 and the holding protrusion 85. In the third preferred embodiment, instead of the holding protrusion 85, a posture retaining protrusion (corresponding to a posture retaining portion of the present invention) 100 is additionally provided on the base member 71, so that two-point support for the facing portion 83 is provided by the posture retaining protrusion 100 and the raised portion 72 both abutting on the lower surface of the facing portion 83. The other constructions are similar to the first preferred embodiment.

Other Preferred Embodiments

The present invention is not limited to the preferred embodiments described above with reference to the drawings. The following preferred embodiments are included in the technical scope of the present invention, for example.

(1) In the first to third preferred embodiments, a direct-light-type backlight device, in which cold-cathode tubes 65 as a light source are arranged beneath the liquid-crystal panel 30, is shown as an illustrative example. However, a backlight device of another type, in which a light source is arranged on the lateral sides, can be used.

(2) In the first and second preferred embodiments, the holding protrusion 85 or 95 is provided on one side. That is, the holding protrusion 85 preferably is provided on the holding base 84 in the first preferred embodiment, while the holding protrusion 95 is provided on the diffuser plate 90 in the second preferred embodiment. However, the holding protrusion 85 or 95 is not limited to these constructions. For example, that may be provided on each of the holding base 84 and the diffuser plate 90 so as to abut on each other. Further, in the first and second preferred embodiments, the holding protrusion 85 or 95 is integrated with the inner frame 80 or the diffuser plate 90. However, that may be provided as a separate component.

(3) In the first to third preferred embodiments, two-point support for the facing portion 83 of the inner frame 80 is provided. However, in the case that two-point support is not required for securing the sufficient supporting strength (e.g., in the case that the inner frame 80 is made of metal), one-point support can be used (i.e., support by the raised portion 72 may be eliminated).

(4) In the first and second preferred embodiments, the height of the holding protrusion 85 or 95 is purposely set to be larger than the thickness of the optical sheets 55, so that the gap is formed between the holding base 84 and the optical sheets 55. However, preferably, the gap is set to be as narrow as possible. Therefore, contact therebetween may be formed so that pressure is not applied on the optical sheets 55.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An optical-sheet supporting structure comprising:
   an optical sheet;
   a diffuser plate, on which said optical sheet is placed so that an exposed portion is left on a periphery thereof, having a larger thickness than said optical sheet;
   a base-side panel support that abuts on the periphery of said diffuser plate so as to hold said diffuser plate;
   a holding-side panel support having a substantially frame shaped configuration, which is disposed on an opposite side of said base-side panel support so as to hold the periphery of at least said diffuser plate in cooperation with said base-side panel support and therebetween; and
   a holding protrusion that is disposed on and projects from at least one of said exposed portion of said diffuser plate and a portion of said holding-side panel support opposite to said exposed portion so as to abut on the other.

2. An optical-sheet supporting structure as in claim 1, wherein said holding protrusion is integrated with at least one of said holding-side panel support and said diffuser plate.

3. An optical-sheet supporting structure as in claim 2, wherein:
   said holding-side panel support includes a facing portion which is cantilevered and extends so as to overlap with the periphery of said optical sheet, said holding protrusion being disposed on and projecting from said facing portion; and
   a projecting length of said holding protrusion from said facing portion is larger than a thickness of said optical sheet, so that a gap is maintained between said optical sheet and said facing portion.

4. An optical-sheet supporting structure as in claim 3, wherein an escape portion corresponding to said holding protrusion is defined by a notch on said optical sheet, so that a portion of said diffuser plate is exposed as said exposed portion.

5. An optical-sheet supporting structure as in claim 4, further comprising a posture retaining portion, which is disposed on one of said base-side panel support and said facing portion, and abuts on the other so as to provide two-point support for said facing portion together with said holding protrusion.

6. An optical-sheet supporting structure comprising:
   a flat diffuser plate;
   an optical sheet having a smaller thickness than said diffuser plate and placed on said diffuser plate so that an exposed portion is left on a periphery thereof;
   a base-side panel support that abuts on the periphery of said diffuser plate so as to hold said diffuser plate;
   a holding-side panel support, which includes a facing portion positioned on an opposite side of said base-side panel support so as to hold the periphery of said diffuser plate and said optical sheet in cooperation with said base-side panel support and therebetween, said holding-side panel support having a substantially frame-shaped configuration as a whole; and
   at least two posture retaining portions arranged to retain a posture of said facing portion so that said facing portion extends along a surface of said optical sheet.

7. A lighting device comprising:
   an optical sheet;
   a diffuser plate, on which said optical sheet is placed so that an exposed portion is left on a periphery thereof, having a larger thickness than said optical sheet;
   a base-side panel support that abuts on the periphery of said diffuser plate so as to hold said diffuser plate;
   a holding-side panel support having a substantially frame-shaped configuration, which is disposed on an opposite side of said base-side panel support so as to hold the periphery of at least said diffuser plate in cooperation with said base-side panel support and therebetween;
   a holding protrusion that is disposed on and projects from at least one of said exposed portion of said diffuser plate and a portion of said holding-side panel support opposite to said exposed portion so as to abut on the other; and
   a light source disposed on one of a back side and a lateral side of said optical sheet.

8. A display device comprising:
   a lighting device that includes:
      an optical sheet;
      a diffuser plate, on which said optical sheet is placed so that an exposed portion is left on a periphery thereof, having a larger thickness than said optical sheet;
      a base-side panel support that abuts on the periphery of said diffuser plate so as to hold said diffuser plate;
      a holding-side panel support having a substantially frame-shaped configuration, which is disposed on an opposite side of said base-side panel support so as to hold the periphery of at least said diffuser plate in cooperation with said base-side panel support and therebetween;
      a holding protrusion that is disposed on and projects from at least one of said exposed portion of said diffuser plate and a portion of said holding-side panel support opposite to said exposed portion so as to abut on the other; and
      a light source disposed on one of a back side and a lateral side of said optical sheet; and
   a liquid-crystal panel disposed on a top side of said lighting device.

* * * * *